United States Patent
She et al.

(10) Patent No.: US 8,876,188 B1
(45) Date of Patent: Nov. 4, 2014

(54) VEHICLE BODY STRUCTURE

(71) Applicant: Nissan North America, Inc., Franklin, TN (US)

(72) Inventors: Yimin She, Farmington Hills, MI (US); Gerald Faber, Plymouth, MI (US); Patrick Grondin, Royal Oak, MI (US); Adam Tacey, Wixom, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 14/150,961

(22) Filed: Jan. 9, 2014

(51) Int. Cl.
*B60R 5/00* (2006.01)
*B60J 10/08* (2006.01)

(52) U.S. Cl.
CPC ..................... *B60J 10/085* (2013.01)
USPC ................... 296/146.7; 296/146.9; 296/146.5

(58) Field of Classification Search
USPC ..................... 296/146.5, 146.7, 146.9; 49/502
See application file for complete search history.

(56) References Cited

U.S. PATENT DOCUMENTS

| | | | |
|---|---|---|---|
| 4,969,295 A | | 11/1990 | Nishikawa et al. |
| 5,651,578 A | * | 7/1997 | Mistopoulos et al. ..... 296/146.9 |
| 6,767,049 B1 | * | 7/2004 | Morrison et al. .......... 296/146.7 |

FOREIGN PATENT DOCUMENTS

JP 2007-055570 A 3/2007

OTHER PUBLICATIONS

2014 Chevrolet Malibu driver door.
2014 Honda Accord driver door.
2014 Hyundai Sonata driver door.
2014 Mazda 3 driver door.
2013 Toyota 4Runner driver door.
2014 Toyota Avalon driver door.
2013 Nissan Pathfinder driver door.

* cited by examiner

*Primary Examiner* — Joseph D Pape
(74) *Attorney, Agent, or Firm* — Global IP Counselors, LLP

(57) ABSTRACT

A seal is installed to a seal supporting surface of a vehicle pillar structure. A door assembly has an inner panel and a window sash section with an attachment area at an intersection between the inner panel and the window sash section. A trim panel has a main body covering at least a portion of an inboard surface of the inner panel and a flange that extends along an upright edge of the main body. The flange has an upper end covering the attachment area and a lower end of the window sash section. The window sash section and the flange define a sealing surface extending from an upper end of the door assembly to a lower end of the door assembly. The seal contacts the sealing surface with the door assembly in the closed position.

16 Claims, 9 Drawing Sheets

VEHICLE BODY STRUCTURE

BACKGROUND

1. Field of the Invention

The present invention generally relates to a vehicle body structure. More specifically, the present invention relates to vehicle body structure with a door trim panel that includes a flange that covers the welded seam between a lower door section and a window sash section, the flange at least partially defining a seal contacting surface.

2. Background Information

A vehicle door that includes a window is often constructed with a plurality of panels that define a lower door section and a window sash section. The lower door section and the window sash section are typically welded to one another at an intersection therebetween. The intersection often includes a slight convexity at the site of the weld.

The vehicle door is mounted to a vehicle body structure that defines a door opening. A seal is typically installed to the vehicle body structure on a surface that defines the door opening. The seal contacts the lower door section, the window sash section and the weld when the door is in a closed position. The seal is more effective if the seal contacts surfaces of the door that are smooth and without concavities or convexities.

SUMMARY

One object of the disclosure is to provide a door assembly having a seam between a lower section and a window sash section with a trim element that covers the seam, with the trim element defining a seal contacting surface.

Another object of the disclosure is to provide a complete sealing arrangement between a door and a vehicle structure.

In view of the state of the known technology, one aspect of the disclosure includes a vehicle body structure having a door assembly and a trim panel. The door assembly is moveable between an open position and a closed position. The door assembly has an inner panel and a window sash section defining a window opening, with an attachment area at an intersection between the inner panel and the window sash section. The trim panel has a main body covering at least a portion of an inboard surface of the inner panel and a flange that extends along an upright edge of the main body. The flange has an upper end covering the attachment area and a lower end of the window sash section. An inner side of the window sash section and the flange define a sealing surface that extends from an upper end of the door assembly to a lower end of the door assembly.

BRIEF DESCRIPTION OF THE DRAWINGS

Referring now to the attached drawings which form a part of this original

DISCLOSURE

Figure 1:
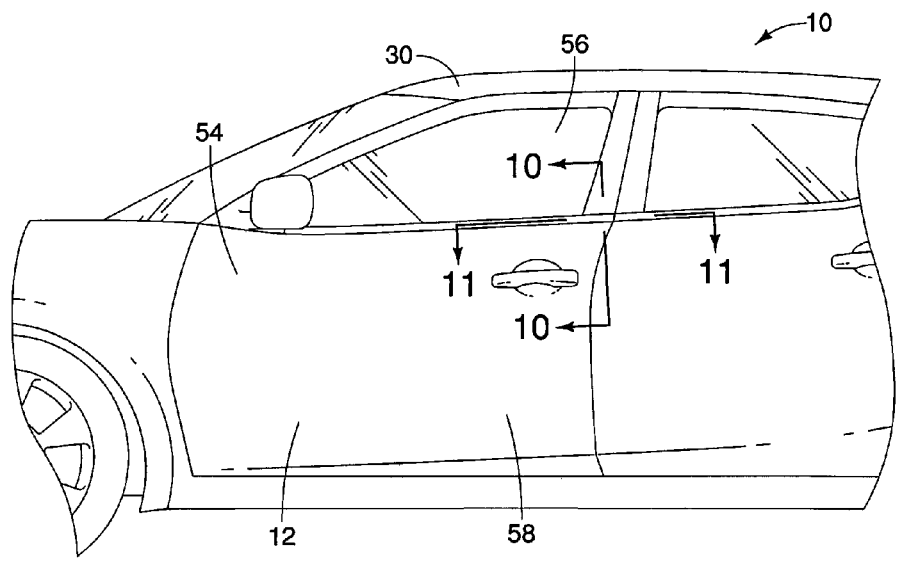
Figure 2:
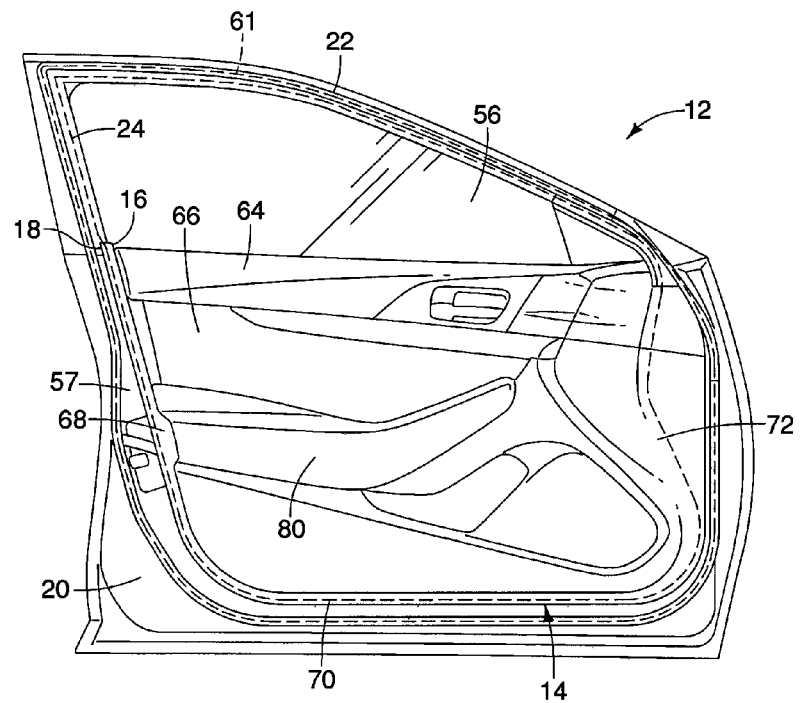
Figure 3:
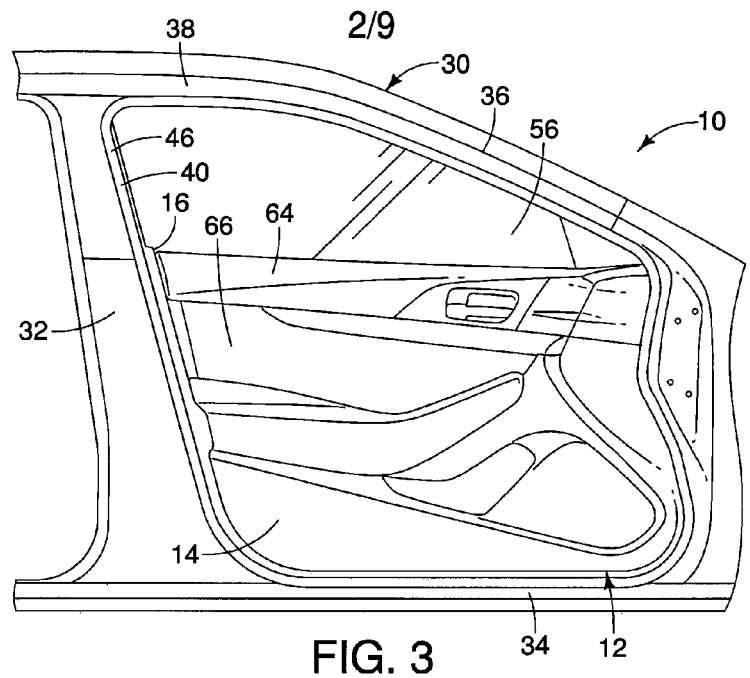
Figure 4:
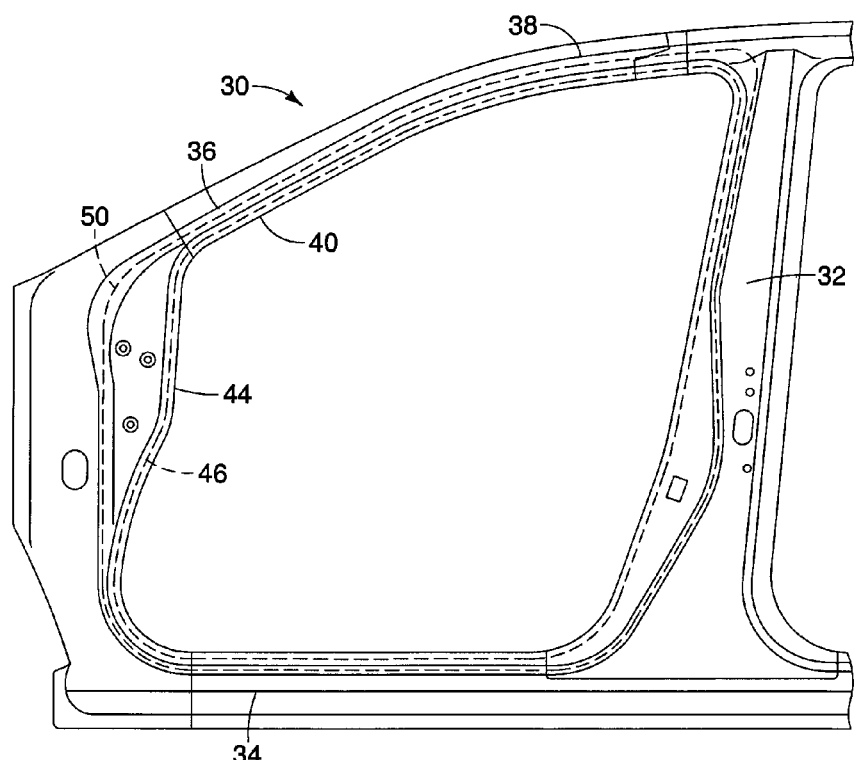
Figure 5:
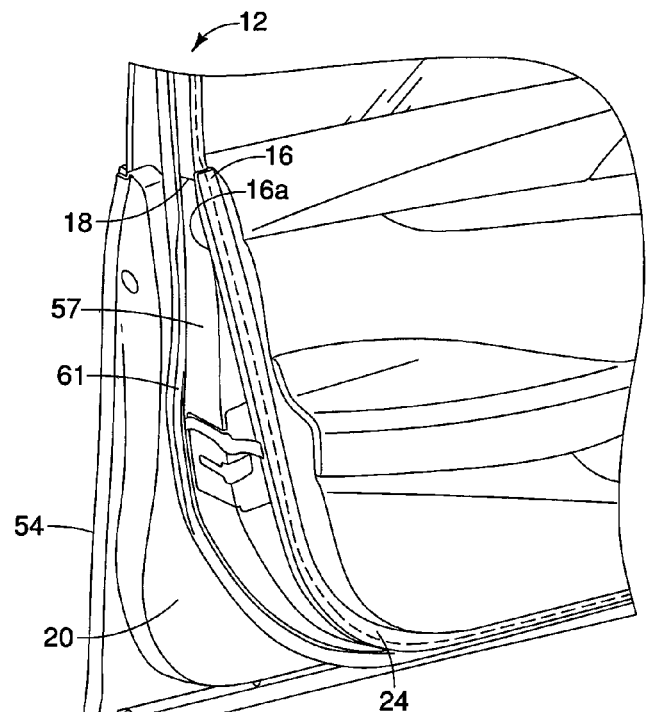
Figure 6:
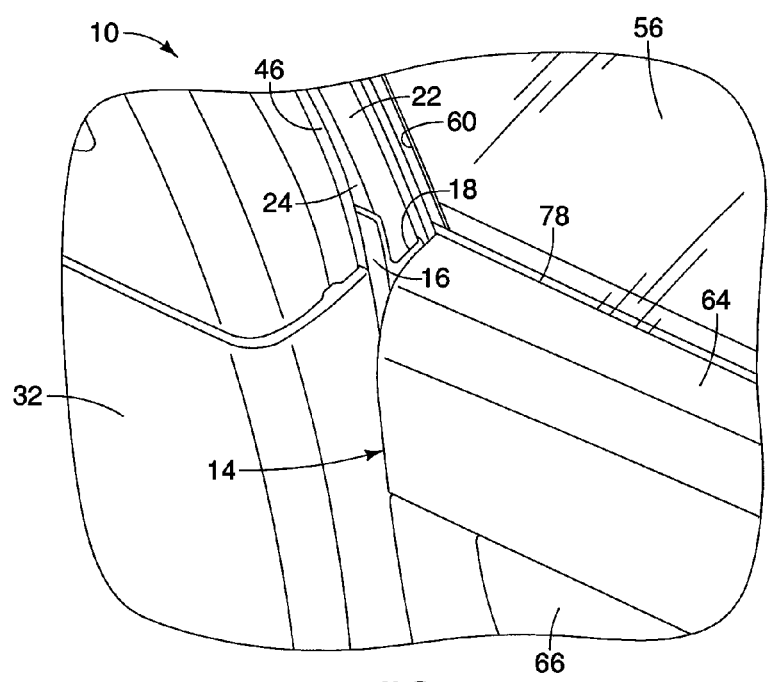
Figure 7:
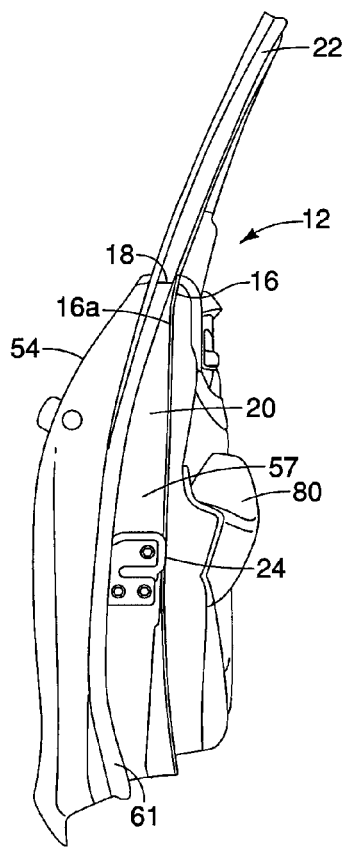
Figure 8:
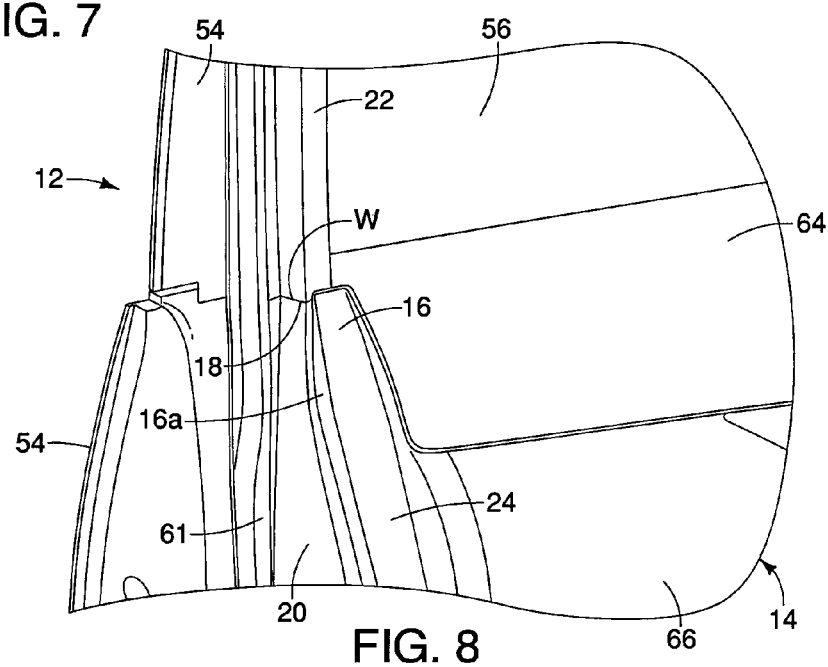
Figure 9:
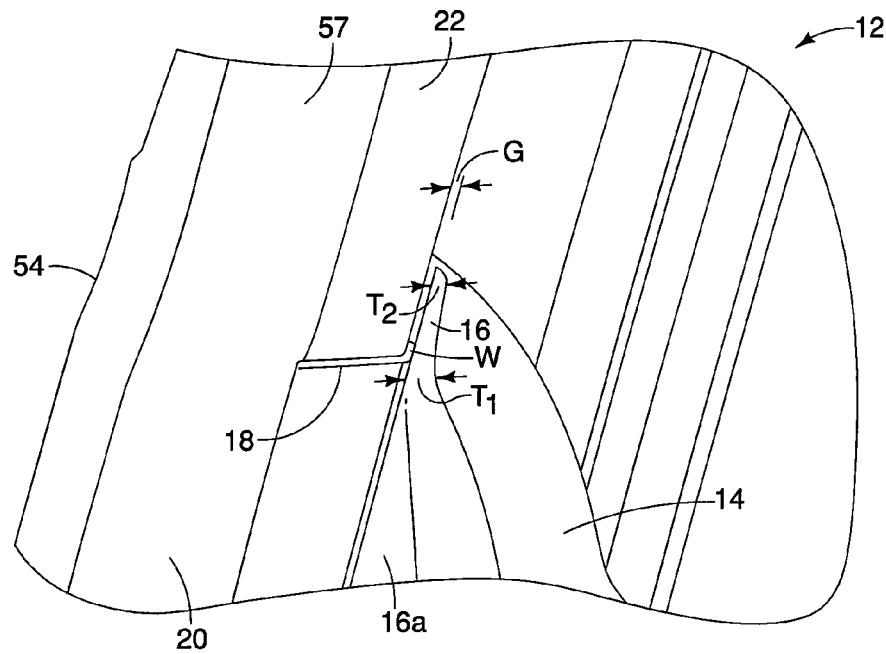
Figure 10:
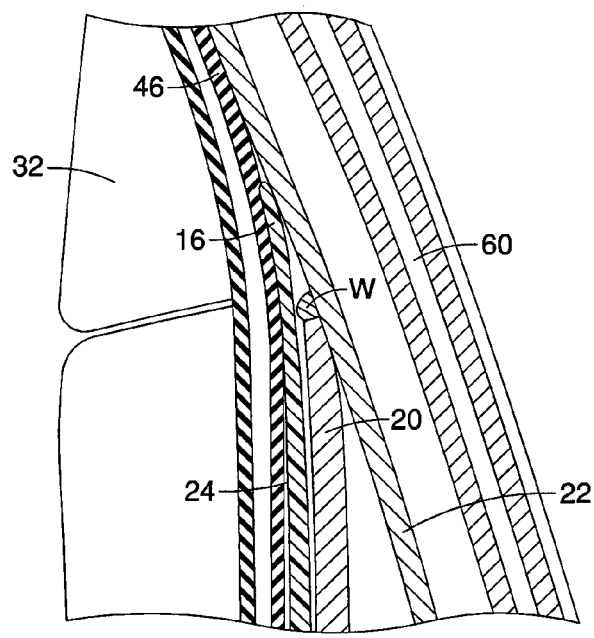
Figure 11:
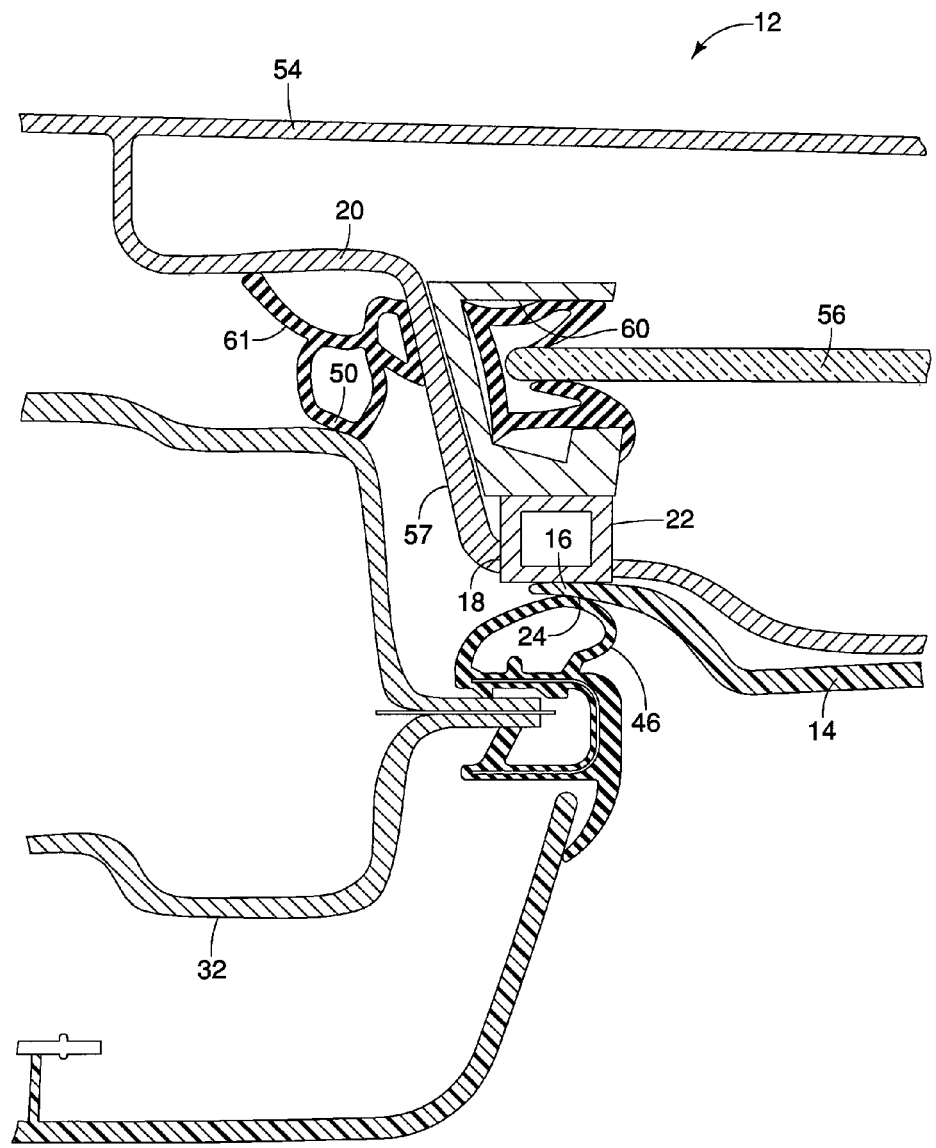
Figure 12:
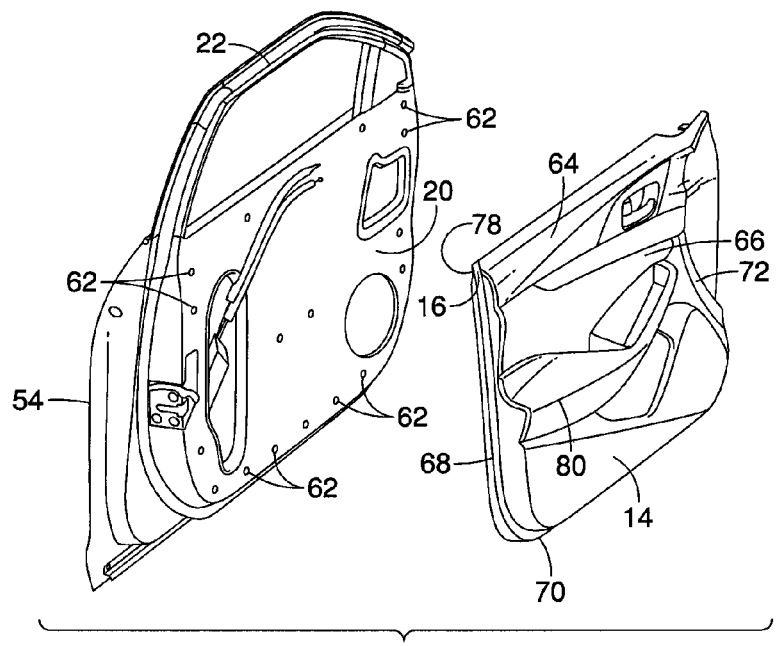
Figure 13:
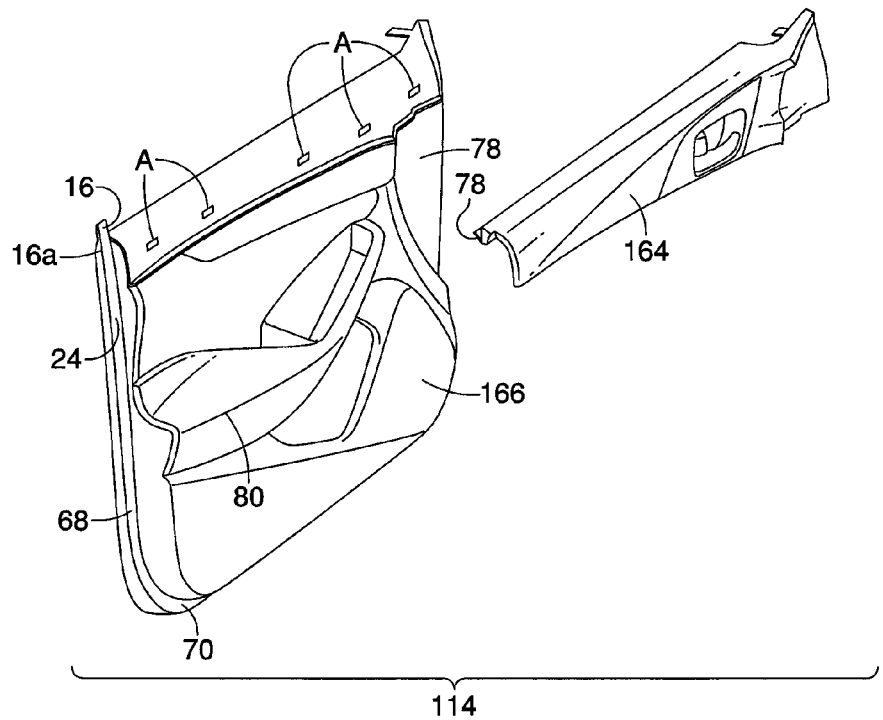
Figure 14:
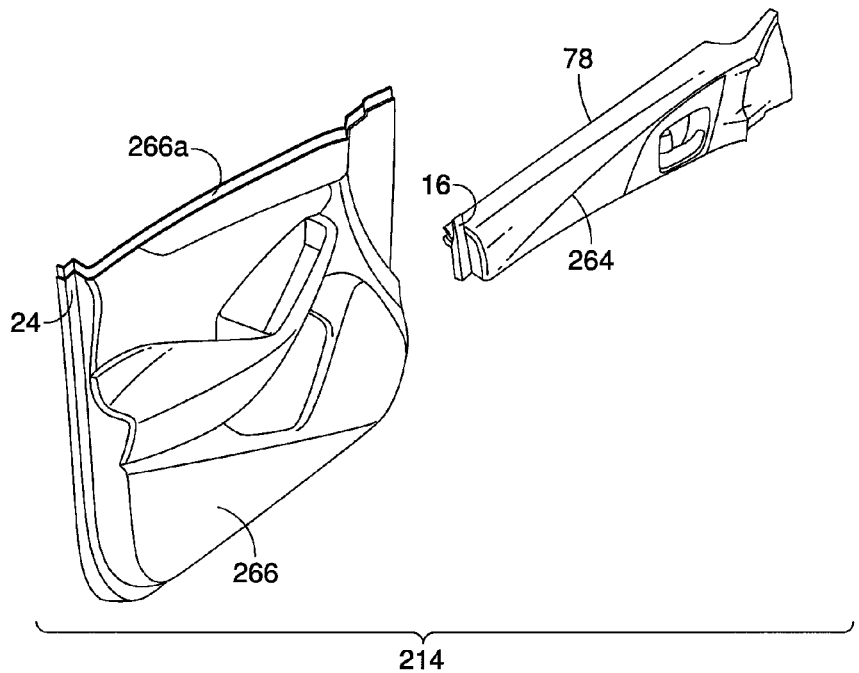
Figure 15:
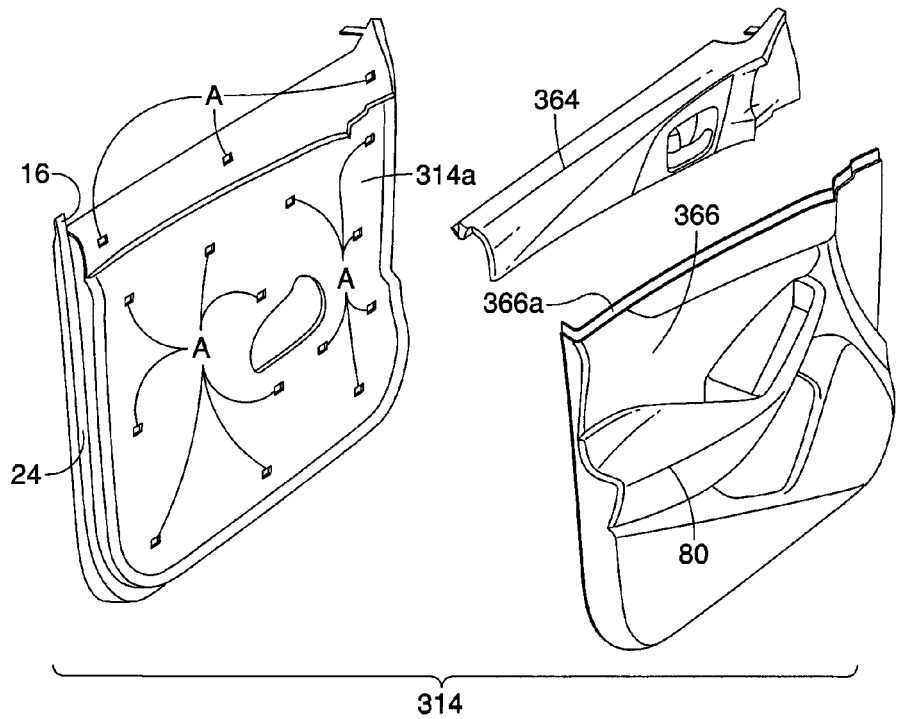
Figure 16:
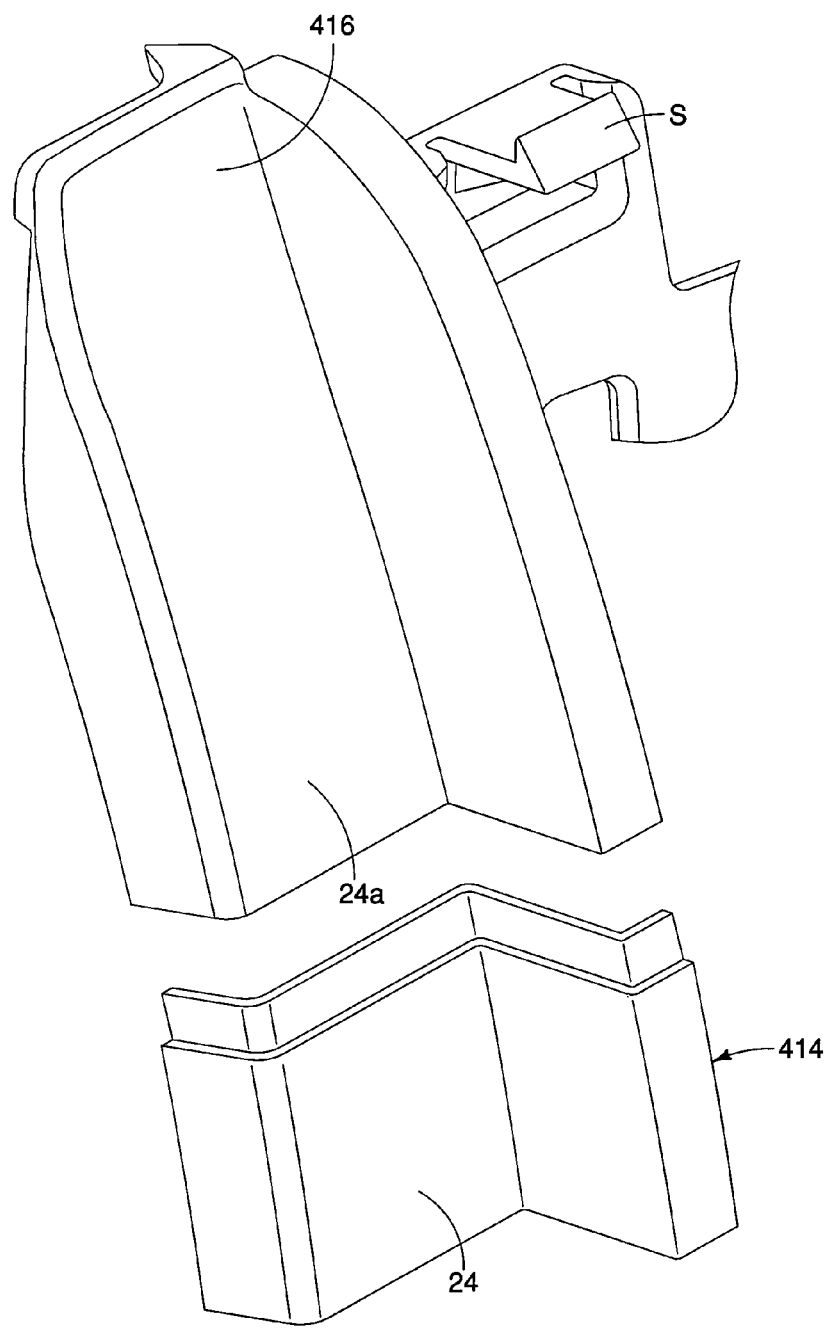

FIG. 1 is a side view of a vehicle showing a door with a lower panel section and a window sash section in accordance with a first embodiment;

FIG. 2 is a side view of an interior side of the door showing a seam between the lower panel section and the window sash section, and a trim panel assembly that includes a flange covering part of the seam at least partially defining a first sealing surface in accordance with the first embodiment;

FIG. 3 is a side view of an interior side of the vehicle with the door in a closed position showing a first seal encircling a door opening, the seal contacting the first sealing surface of the door and the flange of the trim panel assembly in accordance with the first embodiment;

FIG. 4 is a side view of a portion of an exterior side of the vehicle with the door removed showing the first seal encircling the door opening and a second seal surface that encircles the first seal in accordance with the first embodiment;

FIG. 5 is a perspective view of the door in an open position showing the seam, the trim panel, the flange and a second seal mounted on the door, with the flange covering a portion of the seam in accordance with the first embodiment;

FIG. 6 is a perspective view of a portion of the door and the interior of the vehicle showing the seal contacting the flange in accordance with the first embodiment;

FIG. 7 is an end view of the door showing the seam and the flange, with the flange covering a portion of the seam in accordance with the first embodiment;

FIG. 8 is another perspective view of a portion of the door showing the seam and the flange, with the flange covering a portion of the seam in accordance with the first embodiment;

FIG. 9 is an enlarged end plan view of a portion of the door showing the seam and the flange, with the flange covering a portion of the seam in accordance with the first embodiment;

FIG. 10 is a cross-sectional view of the door and the vehicle with the door in a closed position taken along the upright line 10-10 in FIG. 1, showing the first seal contacting the flange in accordance with the first embodiment;

FIG. 11 is another cross-sectional view of the door and the vehicle with the door in a closed position taken along the horizontally oriented line 11-11 in FIG. 1, showing the first seal contacting the flange and the second seal contacting a second seal contacting surface in accordance with the first embodiment;

FIG. 12 is an exploded view of the door showing the trim panel assembly as a one piece panel in accordance with the first embodiment;

FIG. 13 is an exploded view of a trim panel assembly that includes a main body and an upper portion that is configured to cover a window sill section of the door, with the flange formed as part of the main body in accordance with a second embodiment;

FIG. 14 is an exploded view of a trim panel assembly that includes a main body and an upper portion that is configured to cover a window sill section of the door, with the flange formed as part of the upper portion in accordance with a third embodiment;

FIG. 15 is an exploded view of a trim panel assembly that includes a main body, a decorative panel portion and an upper portion that is configured to cover a window sill section of the door, with the flange formed as part of the main body in accordance with a fourth embodiment; and FIG. 16 is an exploded view of a trim panel assembly that includes a main body and a separate flange portion in accordance with a fifth embodiment.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIG. 1, a vehicle 10 is illustrated in accordance with a first embodiment. As shown in FIG. 2, the vehicle 10 includes a door 12 with a trim panel 14. The trim panel 14 includes a flange 16 that covers an attachment area 18 located at the intersection of an inner panel 20 and a window sash section 22. The flange 16 partially defines a first seal contacting surface 24 that encircles an inner side of the door 12. The flange 16 provides a smooth transition between the inner panel 20 and the window sash section 22, as described in greater detail below.

A description of the vehicle 10 is now provided with initial reference to FIGS. 1, 3 and 4. The vehicle 10 has, among other features, a side body structure 30 with a pillar structure 32, a sill structure 34, an A-pillar structure 36 and a roof rail 38 that surround and define a door opening 40.

As shown in FIG. 4, an exterior side of the side body structure 30 includes a seal supporting lip 44 that completely encircles the door opening 40. A first seal 46 is installed to the seal supporting lip 44. The first seal 46 also completely encircles the door opening 40. More specifically, the seal supporting lip 44 is defined along edges of the pillar structure 32, the sill structure 34, the A-pillar structure 36 and the roof rail 38. The first seal 46 is installed to the seal supporting lip 44 in order to contact the first seal contacting surface 24 of the door 12 with the door 12 in a closed position. The first seal contacting surface 24 is described in greater detail below.

The side body structure 30 also includes a second seal contacting surface 50, located adjacent to the seal supporting lip 44, and encircling the seal supporting lip 44, as shown in FIG. 4. More specifically, the second seal contacting surface 50 is defined on surfaces of the pillar structure 32, the sill structure 34, the A-pillar structure 36 and the roof rail 38.

Returning to FIG. 2, a more detailed description of the door 12 is now provided. The door 12 basically includes an outer panel 54 (shown in FIG. 1), the inner panel 20, the window sash section 22, a window glass 56 and the trim panel 14. The inner panel 20 and the outer panel 54 are fixedly attached to one another by, for example, welding in a conventional manner. The inner panel 20 and outer panel 54 define a door jamb facing surface 57 and a lower door section 58. The door jamb facing surface 57 is basically a section of the inner panel 20 that extends from the outer panel 54 inboard to a remainder of the inner panel 20. With the door 12 in a closed position, the door jamb facing surface 57 is adjacent to the pillar structure 32, as shown in FIG. 11.

The lower door section 58 is a hollow portion of the door 12 that includes various mechanisms disposed therein. For example, a window regulator (not shown) supports the window glass 56 such that the window glass 56 can be moved up and down within a track 60 (FIGS. 6, 10 and 11) defined within the window sash section 22. Further, a door latch mechanism (not shown) is also provided within the hollow space within the lower section 58 of the door 12. Since window regulators and door latch mechanisms are conventional components of a vehicle door, further description is omitted for the sake of brevity.

The window sash section 22 is attached to at least the inner panel 20 at the intersection between the window sash section 22 and the inner panel 20. This intersection or seam defines the attachment area 18. The window sash section 22 and the inner panel 20 are attached to one another by, for example, welding in the attachment area 18. As shown in FIG. 10, a welding bead W is often present at the attachment area 18. The attachment area 18 is basically a seam between the window sash section 22 and the inner panel 20. An interior side of the window sash section 22 is smooth and serves as part of the first seal contacting surface 24, as described in greater detail below.

The door 12 also includes a second seal 61 that is mounted to a periphery of the door 12, along the window sash section 22 and around an outer periphery of the lower door section 58. The second seal 61 encircles the first seal contacting surface 24, as shown in FIG. 2. As shown in FIGS. 5, 7 and 11, the second seal 61 is also positioned outboard of the first seal contacting surface 24.

A description of the trim panel 14 is now provided with specific reference to FIGS. 2 and 5-12. The trim panel 14 is attached to the inner panel 20 of the door 12 in a conventional manner. For example, a plurality of conventional snap-fitting projections (not shown) can be attached to the trim panel 14 and inserted into corresponding apertures 62 (FIG. 12) of the inner panel 20 to fix the trim panel 14 to the inner panel 20 of the door 12. Since snap-fitting projections and their use for installing trim panels to vehicle elements is well known, further description is omitted for the sake of brevity.

The trim panel 14 can be a single panel element or can be assembled from a plurality of separate elements that attach to one another. However, in the first embodiment, the trim panel 14 is basically a unitary monolithic element, as shown in FIG. 12.

The window sash section 22, the flange 16, and outer peripheral sections of the trim panel 14 define the first seal contacting surface 24. More specifically as shown in FIG. 2, the trim panel 14 includes a window ledge trim section 64, a main body 66, a first seal surface section 68, a second seal surface section 70, a third seal surface section 72 and the flange 16.

The window ledge trim section 64 includes a conventional latch operating mechanism 76 and an inner window seal 78. The main body 66 includes an arm rest section 80 and a window control panel (not shown). Since latch operating mechanisms, arm rests, window seals and window control panels are conventional components of a vehicle door, further description is omitted for the sake of brevity.

The first seal surface section 68 is basically an elongated lip formed with the main body 66 of the trim panel 14 that extends downward from the flange 16 to the bottom of the main body 66. The second seal surface section 70 is an extension of the elongated lip that extends horizontally below the main body 66 of the trim panel 14. The third seal surface section 72 is formed with the main body 66 along a forward side of the main body 66 of the trim panel 14, extending from a forward end of the second seal surface section 70 upward to a forward bottom end of the window sash section 22. The first seal contacting surface 24 of the door 12 basically extends from the flange 16 along the inboard surfaces of the first, second and third seal surface sections 68, 70 and 72, and further extends along the inboard surface of the window sash section 22 back to the flange 16. The first seal contacting surface 24 therefore encircles the door 12 such that the first seal contacting surface 24 contacts the first seal 46 of the side body structure 30 with the door 12 in the closed position.

As is shown in FIG. 2, the second seal 61 is located rearward of the first seal contacting surface 24 along the first seal surface section 68. The second seal 61 is located below of the first seal contacting surface 24 along the second seal surface section 70. The second seal 61 is located forward of the first seal contacting surface 24 along the third seal surface section 72. Further, the second seal 61 is located above of the first seal contacting surface 24 along a forward and upper area of the window sash section 22 and is located rearward of the first seal contacting surface 24 along a rearward area of the window sash section 22. Finally, the second seal 61 is located rearward of the first seal contacting surface 24 adjacent to the flange 16.

As shown in FIGS. 8 and 9, the flange 16 is a slightly elongated tongue shaped section of the trim panel 14 that is dimensioned and positioned to cover the attachment area 18 and the weld W with the trim panel 14 installed to the inner panel 20. In the first embodiment, the flange 16 is integrally formed with the remainder of the trim panel 14 as a single, unitary, monolithic element.

As shown in FIGS. 5 and 7-9, a lower area of the flange 16 defines a sub-flange section 16a that projects outboard from the first seal contacting surface 24 covering a portion of the door jamb facing surface 57a.

For convenience, in FIGS. 2 and 5, a dashed line overlays the first seal contacting surface 24 to indicate the overall shape of the first seal contacting surface 24. Another dashed line overlays the second seal 61 in FIG. 2, to indicate the overall shape of the second seal 61. In FIG. 4, another dashed line overlays the first seal 46 to indicate the overall shape of the first seal 46. Further, in FIG. 4, yet another dashed line overlays the second seal contacting surface 50 to indicate the overall shape of the second seal contacting surface 50.

As is shown in FIG. 9, the flange 16 covers the weld W at the attachment area 18. With the door 12 in an open position, as shown in FIG. 9, the flange 16 is spaced apart from the adjacent surface of the window sash section 22 by a gap G. The trim panel 14 and hence the flange 16, are made of a flexible, resilient material. Therefore, with the door 12 in the closed position and the first seal 46 contacting the flange 16, the flange 16 is elastically deformed thereby contacting the window sash section 22, as shown in FIG. 6. Further, the flange 16 has a tapering thickness toward an upper end thereof. Specifically, the flange 16 has a first thickness $T_1$ adjacent to the main body 66 of the trim panel 14 and a second thickness $T_2$ at the upper end of the flange 16. The second thickness $T_2$ is smaller than the first thickness $T_1$.

With the tapering thickness of the flange 16, combined with the resilient flexibility of the material used to make the flange 16, the flange 16 can move slightly to cover the weld W and provide a consistent seal when in contact with the first seal 46. Hence, issues related to the size of the weld W and air gaps in the seal between the door opening 40 and the door 12 in the vicinity of the weld W are avoided.

In the first embodiment, the trim panel 14 is preferably made of a plastic or polymer material with at least a small degree of resilient flexibility. Hence, in the first embodiment, the trim panel 14 and the flange 16 are made of a uniform material with a uniform appearance.

However, it should be understood from the drawings and the description herein, that the window ledge trim section 64, the main body 66 and the flange 16 can have different cosmetic constructions, such as differing materials and/or differing colors. For example, the window ledge trim section 64 and the main body 66 can be provided with differing appearances and/or coloring. The flange 16 can be provided with the appearance and/or coloring of either of the window ledge trim section 64 and the main body 66. Further, sub-trim panels, such as decorative materials or a separate arm rest section, can be attached to the trim panel 14 to create cosmetic accents.

Further, as described in the alternative embodiments below, the trim panel 14 can be assembled from differing elements that are mechanically attached to one another.

Second Embodiment

Referring now to FIG. 13, a trim panel 114 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The trim panel 114 in the second embodiment includes a window ledge trim section 164 and a main body 166. The window ledge trim section 164 includes all the features of the window ledge trim section 64 of the first embodiment, including the inner window seal 78. However, the window ledge trim section 164 is a separate element from the main body 166. Thus, the window ledge trim section 164 includes a plurality of snap-fitting projections (not shown) that insert into apertures A in the main body 166 providing a mechanical connection between the window ledge trim section 164 and the main body 166.

The main body 166 includes all the features of the main body 66 of the first embodiment, including the arm rest section 80, a portion of the first seal contacting surface 24, the first seal surface section 68, the second seal surface section 70, the third seal surface section 72 and the flange 16. More specifically, the flange 16 and the main body 166 are integrally formed as a one piece, unitary, monolithic element. The flange 16 has all the dimensions and resilient flexibility as described above with respect to the first embodiment.

Since the window ledge trim section 164 and the main body 166 are different elements, while the main body 166 and the flange 16 are made of the same material, the main body 166 (the lower door trim section) is provided with a first cosmetic feature, and the flange 16 is provided with the same first cosmetic feature. The first cosmetic feature can be a specific color and/or a specific surface contour or surface texture. The window ledge trim section 164, on the other hand, is provided with a second cosmetic feature different from the first cosmetic feature. The second cosmetic feature can be a specific color and/or a specific surface contour or surface texture.

Third Embodiment

Referring now to FIG. 14, a trim panel assembly 214 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The trim panel 214 in the third embodiment includes a window ledge trim section 264 and a main body 266. The window ledge trim section 264 includes all the features of the window ledge trim section 64 of the first embodiment, including the inner window seal 78. However, the window ledge trim section 264 is a separate element from the main body 266. Thus, the window ledge trim section 264 includes a plurality of mechanical fasteners (not shown) that attach to an upper end of the main body 266 in a conventional manner providing a mechanical connection between the window ledge trim section 264 and the main body 266. The window ledge trim section 264 also includes the flange 16. More specifically, the flange 16 and the window ledge trim section 264 are integrally formed as a one piece, unitary, monolithic element. The flange 16 has all the dimensions and resilient flexibility as described above with respect to the first embodiment.

The main body 266 includes all the features of the main body 66 of the first embodiment, including the arm rest section 80 and a portion of the first seal contacting surface 24, the first seal surface section 68, the second seal surface section 70 and the third seal surface section 72. The main body 266 also includes an attachment flange 266a for attachment to the window ledge trim section 264.

Since the window ledge trim section 264 and the main body 266 are different elements, while the window ledge trim section 264 and the flange 16 are made of the same material, the main body 266 (the lower door trim section) is provided with a first cosmetic feature. The first cosmetic feature can be a specific color and/or a specific surface contour or surface texture. The window ledge trim section 264 and the flange 16 are provided with a second cosmetic feature different from the first cosmetic feature. The second cosmetic feature can be a specific color and/or a specific surface contour or surface texture. However, it is also possible to provide the flange 16 with a third cosmetic feature different than the first and second cosmetic features.

Fourth Embodiment

Referring now to FIG. 15, a trim panel assembly 314 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The trim panel 314 in the fourth embodiment includes a base section 314a, a window ledge trim section 364 and a main body 366. The base section 314a includes a portion of the first seal contacting surface 24, including the first seal surface section 68, the second seal surface section 70 and the third seal surface section 72. The base section 314a also includes the flange 16, formed integrally therewith. Specifically, the base section 314a and the flange 16, along with all of the portions that define the first seal contacting surface 24 are integrally formed as a one piece, unitary, monolithic element. The flange 16 has all the dimensions and resilient flexibility as described above with respect to the first embodiment. The base section 314a also includes a plurality of apertures A.

The window ledge trim section 364 includes all the features of the window ledge trim section 64 of the first embodiment, including the inner window seal 78. The window ledge trim section 364 is a separate element from the base section 314a and the main body 366. The window ledge trim section 364 includes a plurality of mechanical fasteners (not shown), such as snap-fitting projections that fit into the apertures A thereby attaching to the base section 314a in a conventional manner providing a mechanical connection therebetween.

The main body 366 includes all the features of the main body 66 of the first embodiment, including the arm rest section 80. The main body 366 also includes an attachment flange 366a for mechanical attachment to the window ledge trim section 364. The main body 366 also includes a plurality of mechanical fasteners (not shown), such as snap-fitting projections that fit into the apertures A of the base section 314a, thereby attaching to the base section 314a in a conventional manner providing a mechanical connection therebetween.

The base section 314a, window ledge trim section 364 and the main body 366 are all separate elements. The main section 314a and the flange 16 are made of the same material and are provided with a first cosmetic feature. The first cosmetic feature can be a specific color and/or a specific surface contour or surface texture. The window ledge trim section 364 can be provided with a second cosmetic feature different from the first cosmetic feature. The main body 366 can be provided with a third cosmetic feature different from the first and second cosmetic features. The cosmetic features can be specific colors and/or a specific surface contours or surface textures. However, it is also possible to provide the flange 16 with a fourth cosmetic feature different than the first, second and third cosmetic features.

Fifth Embodiment

Referring now to FIG. 16, a flange attachment member 416 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

The flange attachment member 416 is a separate element that can be attached to a trim panel 414. The trim panel 414 is identical to, for example, the trim panel 14 of the first embodiment, except that a portion of the trim panel 14 is cut away to receive the flange attachment member 416. The flange attachment member 416 includes a surface 24a that aligns with the first seal contacting surface 24 of the trim panel 414, extending the first seal contacting surface 24. The flange attachment member 416 is dimensioned in a manner consistent with the flange 16 of the first embodiment such that the weld W (FIG. 9) is covered by the flange attachment member 416a, in order to provide an improved seal contacting surface.

In the fifth embodiment, the flange attachment member 416 is designed to be retro-fitted to the trim panel 414, where the trim panel 414 had previously not included an area that would cover the weld W (FIG. 9). The flange attachment member 416 includes a snap-fitting projection S that is dimensioned to fit into an aperture (not shown) in the trim panel 414 thereby providing a mechanical connection therebetween.

The various elements and components of the vehicle 10, other that the elements described above with respect to the door 12 and various embodiments of the trim panel with the flange 16, are conventional components that are well known in the art. Since these elements and components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure comprising:
    a pillar structure at least partially defining a door opening and having a seal supporting surface;
    a seal installed to the seal supporting surface;
    a door assembly moveable between an open position exposing the door opening and a closed position covering the door opening, the door assembly having an inner panel and a window sash section defining a window opening, with an attachment area at an intersection between the inner panel and the window sash section; and
    a trim panel having a main body covering at least a portion of an inboard surface of the inner panel and a flange that extends along an upright edge of the main body, the flange having an upper end covering the attachment area and a lower end of the window sash section,
    an inner side of the window sash section and the flange defining a sealing surface extending from an upper end of the door assembly to a lower end of the door assembly, such that with the door assembly in the closed position the seal contacts the sealing surface.

2. The vehicle body structure according to claim 1, wherein the flange is integrally formed with the trim panel such that the trim panel and the flange are unitarily formed as a single monolithic element.

3. The vehicle body structure according to claim 2, wherein the trim panel includes a window ledge trim section that covers an upper area of the inner panel of the door assembly defining a window ledge at a bottom end of the window opening.

4. The vehicle body structure according to claim 1, wherein the trim panel includes a window ledge trim section that covers an upper area of the inner panel of the door assembly and a lower door trim section that covers the portion of the inboard surface of the inner panel of the door assembly, the window ledge trim section and the lower door trim section being attached to one another by mechanical fastening elements, and
    the flange is integrally formed with one of the window ledge trim section and the lower door trim section such that the flange and the one of the window ledge trim section and the lower door trim section are unitarily formed as a single monolithic element.

5. The vehicle body structure according to claim 1, wherein the trim panel includes a window ledge trim section that covers an upper area of the inner panel of the door assembly, a lower door trim section covers the portion of the inboard surface of the inner panel of the door assembly and the flange, the window ledge trim section, the lower door trim section and the flange being attached to one another by mechanical fasteners.

6. The vehicle body structure according to claim 5, wherein the lower door trim section is provided with a first cosmetic feature, and
    the flange is provided with the first cosmetic feature.

7. The vehicle body structure according to claim 6, wherein the window ledge trim section is provided with a second cosmetic feature different from the first cosmetic feature.

8. The vehicle body structure according to claim 7, wherein the first cosmetic feature is a first color and the second cosmetic feature is a second color different from the first color.

9. The vehicle body structure according to claim 7, wherein the first cosmetic feature is a first surface texture and the second cosmetic feature is a second surface texture different from the first surface texture.

10. The vehicle body structure according to claim 5, wherein
    the window ledge trim section is provided with a first cosmetic feature, and
    the flange is provided with the first cosmetic feature.

11. The vehicle body structure according to claim 10, wherein
    the lower door trim section is provided with a second cosmetic feature different from the first cosmetic feature.

12. The vehicle body structure according to claim 5, wherein
    the window ledge trim section covers an upper area of the lower door trim section.

13. The vehicle body structure according to claim 1, wherein
    the door assembly has an outboard surface and a door jamb facing surface that extends from the outboard surface to the inboard surface, and
    the flange has a sub-flange section that projects outboard from the sealing surface covering a portion of the door jamb facing surface of the door assembly.

14. The vehicle body structure according to claim 1, wherein
    the flange has a first thickness adjacent to the main body of the trim panel and a second thickness at the upper end of the flange, the second thickness being smaller than the first thickness.

15. The vehicle body structure according to claim 1, wherein
    the flange has a tapering thickness toward the upper end thereof.

16. The vehicle body structure according to claim 1, wherein the pillar structure includes an outer seal contacting surface located outboard relative to the seal supporting surface, the door assembly includes an outer seal supporting surface, and an outer seal is installed to the outer seal supporting surface such that with the door assembly in the closed position the outer seal contacts the outer seal contacting surface, and the door assembly conceals the outer seal.

\* \* \* \* \*